Nov. 26, 1968  G. L. WACHHOLZ  3,412,820
ENDLESS TRACK ATTACHMENT FOR MOTORCYCLES
Filed July 26, 1966
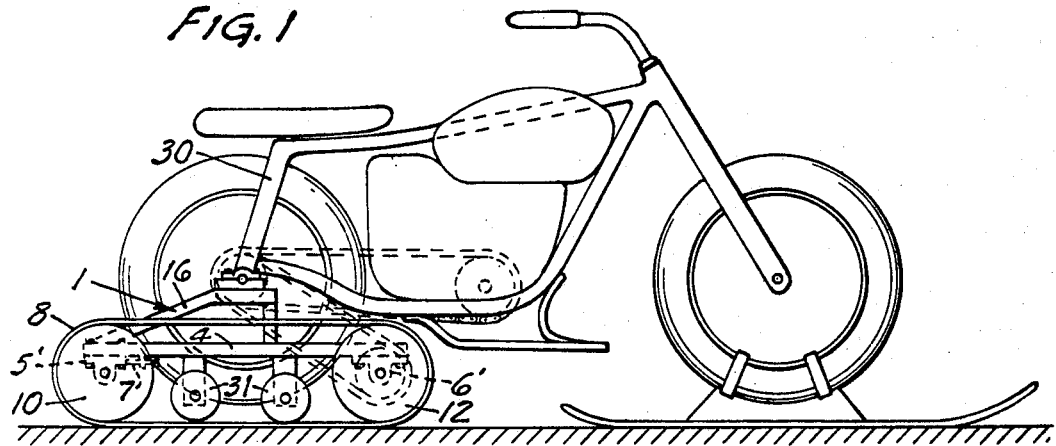
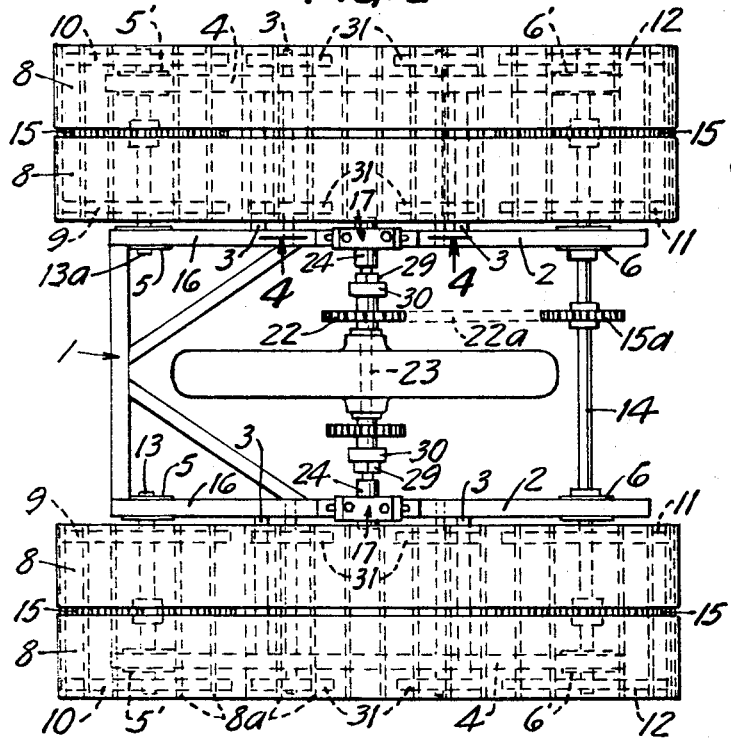
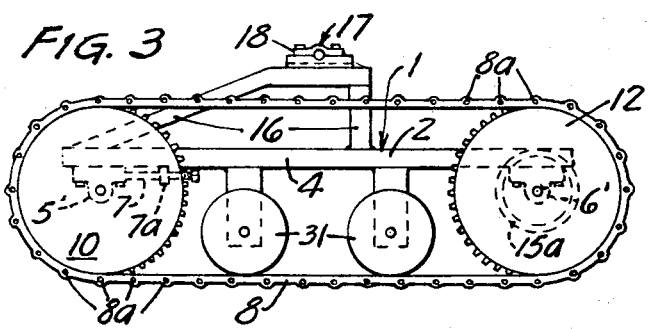
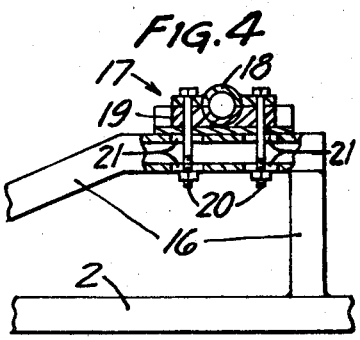
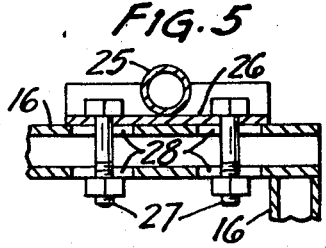
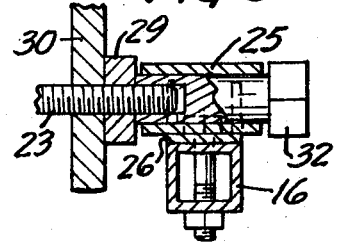
INVENTOR
GLEN L. WACHHOLZ
BY James A. Smith
ATTORNEY United States Patent Office 3,412,820
Patented Nov. 26, 1968

3,412,820
ENDLESS TRACK ATTACHMENT
FOR MOTORCYCLES
Glen L. Wachholz, 1283 Osceola, Ave.,
St. Paul, Minn. 55105
Filed July 26, 1966, Ser. No. 567,873
4 Claims. (Cl. 180—5)

This invention relates to a device for converting a scooter or motorcycle for use in snow. In particular, this device constitutes an attachment for modifying a two wheel vehicle for snow use without significantly disassembling or modifying the vehicle.

In recent years snowmobiles which have been made commercially available for travel on snow and ice have permitted ready maneuverability under adverse winter conditions. These vehicles generally utilize a relatively wide, single continuous belt or track mounted under the central portion of a sled, steering being accomplished by means of skis located at the front of the main sled body. Although snowmobiles have proven to be highly successful, they are practically limited to use during winter and accordingly represent a specialized vehicle having little, if any, use during the warm weather months. Motor driven scooters and cycles can be considered the summer counterpart of the snowmobile but they are unsafe and otherwise unsatisfactory for use on ice or in relatively heavy snow. Over the years many attempts have been made to design a special vehicle which can be used under both winter and summer weather conditions. In one of the earlier attempts, described in U.S. Patent No. 1,068,883, a steering runner is added to the front vehicle frame and a tractor propelling mechanism is incorporated into the rear portion of the frame. Unfortunately, installation is cumbersome and the wheels of the vehicle must be removed. In later years multi-purpose vehicles such as that shown in U.S. 3,801,805 have been developed as a compromise solution to the problem of all-season operation. Still another vehicle designed primarily for use in snow is described in U.S. 3,077,238. This snow vehicle utilizes a steering runner and a dual track unit for propulsion, but it is limited to winter use and cannot be used for highway travel in the summer. Recently a dual track assembly has been advertised as a winter replacement for the rear wheel of a motorcycle, a runner or ski being attached to the front wheel for steering. One of the main problems, however, is the relatively complicated rear drive assembly and the difficulty of installation.

It is an object of the present invention to provide a dual track propulsion unit capable of quick attachment to a two wheel tandem vehicle.

Still another object of this invention is to provide a simple, efficient and economical dual track propulsion unit which can readily be mounted onto the rear end of a motorcycle or motor scooter without substantial modification or disassembly thereof.

Yet another object of this invention is to provide a dual track propulsion unit which can be mounted on or removed from a two wheel vehicle in a matter of minutes with simple, readily available tools and which adapts said vehicle for efficient use on ice or heavy snow.

Other objects and advantages will become apparent from the figures and the following description.

FIGURE 1 shows a side elevation view of the dual track assembly of this invention as mounted onto a motorcycle.

FIGURE 2 is a top plan view of the dual track propulsion unit shown in FIGURE 1.

FIGURE 3 is an enlarged side elevational view of the dual track propulsion unit shown in FIGURE 1.

FIGURE 4 is a cross-sectional view, taken along line 4—4 in FIGURE 2, showing one means for rotatably mounting the dual track assembly onto the rear axle of the vehicle.

FIGURE 5 is a cross-sectional view of still another means for rotatably mounting the dual track assembly onto the rear axle of the vehicle.

FIGURE 6 is a cross-sectional view of the mounting means of FIGURE 5, shown in operating position.

Referring more specifically to the drawings, the dual track propulsion unit comprises a generally horizontally disposed frame surrounding an open central portion and containing suitable braces or supports to maintain structural rigidity, continuous track assemblies mounted on opposite sides of said frame member, means for simultaneously driving each of said continuous track assemblies, and detachable means for rotatably attaching said frame member to the rear axle of a two wheel tandem vehicle. As shown in FIGURE 1 the dual track propulsion unit is attached to the rear axle of the motorcycle and a suitable ski or runners are clamped to the front wheel of the vehicle. The frame member 1, shown in FIGURE 2, having a generally rectangular or horse shoe shape, has its sides 2 adjacent the two, laterally spaced, continuous track assemblies. Frame extension arms 3 are connected to track support members 4, positioned parallel to and outwardly of frame sides 2. Suspended from each frame extension arm and frame side are rear pillow block bearings 5 and 5' and forward pillow block bearings 6 and 6', the rear pillow block bearings 5 and 5' being slidably mounted on the frame extension arms and frame sides to permit longitudinal movement thereon by means of adjustment screws 7 threaded through ears 7a on the frame extension arms 4 and frame sides 2. Each track assembly contains a continuous belt 8 carried at each edge by rear guide wheels 9 and 10 and forward guide wheels 11 and 12, the rear guide wheels in each track being mounted on axles 13 and 13a respectively journaled in rear pillow block bearings 5 and 5' and the forward guide wheels in each track being mounted on axle 14 journaled in forward pillow block bearings 6 and 6'. An intermediate drive sprocket 15a is affixed to forward axle 14. Each continuous belt 8 comprises a flexible material, e.g. rubber, in which are embedded lateral metal rods 8a at regularly spaced intervals. At the centerline of each continuous belt 8 the flexible material is removed to expose these lateral metal rods. Mounted on the axles between rear wheels 9 and 10 and between forward wheels 11 and 12 are belt drive sprockets 15, which engage the exposed lateral metal rods along the centerline of each continuous belt.

Extending upwardly from each side 2 of frame member 1 are elevated support structures 16 having at their upper portion a detachable means 17 for rotatably mounting the frame member about the rear axle of the vehicle, the height thereof being sufficient to elevate the rear vehicle wheel above the lowermost portion of the track assembly. In one preferred embodiment, shown in FIGURE 4, this detachable mounting means comprises a split cylinder journal assembly having a top half 18 and a bottom half 19, each half having a semi-cylindrical portion and a flange extension through which mounting bolts 20 secure the assembly to elevated support structure 16. Elongated slots 21 in the elevated support 16 permit longitudinal adjustment of the frame member relative to the split cylinder journal assembly.

To install the dual track assembly on a motorcycle or motor scooter, an additional drive sprocket 22 is added to the normally non-rotatable rear axle 23 of the vehicle and is rotatably driven along with the rear vehicle wheel. Provision for mounting additional sprockets is normally provided on the rear axle of such vehicles, and quite commonly "trail sprockets" or "racing sprockets" are mounted in these positions. Of course, the track assembly can alternatively be driven by a chain or belt directly from the vehicle motor. Unless the rear vehicle axle extends at least about three inches beyond the vehicle frame 30, it is desirable to add an axle extension shaft 24 to each end of the rear axle. Such extensions may be merely a length of smooth surfaced, rigid pipe with internal threads for screw mounting onto the threaded ends of the vehicle rear axle. When so equipped, the vehicle rear end is elevated over and into the central portion of the frame member, as shown in FIGURES 1 and 2, and, with each top half 18 of the split cylinder journal assemblies removed, is lowered until each axle extension 24 is cradled by the bottom half 19 of the split cylinder journal assemblies on the adjacent elevated support structure 16. The top half 18 of the split cylinder is then placed over the axle extension and the bolts 20 are introduced and tightened. A drive chain 22a is mounted about additional drive sprocket 22 and drive sprocket 15, the tension being adjusted by longitudinal movement of the frame member 1 relative to the detachable mounting means before the bolts 20 are fully tightened. In operation, rotation of the rear vehicle wheel and the additional drive sprocket 22 causes corresponding rotation of intermediate drive sprocket 15a and forward axle 14, which in turn drives the continuous belts or tracks through forward guide wheels 11 and 12 and forward sprockets 15 affixed to axle 14. Rear guide wheels 9 and 10 and rear sprockets 15 are driven by the movement of the continuous belt, along with any idler rolls or wheels 31, if such are used.

Another embodiment of the detachable mounting means 17 is shown in FIGURES 5 and 6. In this embodiment the split cylinder of FIGURE 4 is replaced with a continuous cylinder 25 affixed to flange 26. The bolts 27 hold flange 26 to elevated support structure 16 and can be moved longitudinally in slots 28 to adjust the tension in the drive chain or belt connecting additional sprocket 22 and intermediate drive sprocket 15a. The vehicle rear axle extension shafts 24, which are provided with enlarged head portions 32, are inserted into the continuous cylinders 25 and are screwed into the threaded terminal portions of the vehicle rear axle 23 until they abut the axle nuts 29 which securely hold the vehicle frame 30 in place. As shown in FIGURE 6, the rear axle extension 24 is preferably somewhat longer than the continuous cylinder 25 to permit free rotation thereof about the axle extension without excessive binding friction, although shorter rear axle extensions may be used if the enlarged head portions 32 are omitted.

It will be seen from the above description that the dual track assembly of this invention can be detachably mounted to the rear axle of a two wheel tandem vehicle with ease without requiring substantial modification of that vehicle and without removal of the rear vehicle wheel. Since the axis of rotation for the dual track assembly coincides with the rear vehicle axle, it is possible to navigate over rough terrain or obstacles without necessarily requiring special springs or shock mounts and without special track design. The simplicity of installation and relatively low cost makes it practical to adopt a wide variety of two wheel tandem vehicles, particularly motorcycles and motor scooters, to winter operation in heavy snow. The front wheel of the vehicle preferably contains a detachably mounted single or dual ski which can be clamped onto the front wheel with straps, as shown in FIGURE 1. The free rotation of the front vehicle wheel permits the forward skis to ride over obstacles or irregularities in the terrain. Steering of the vehicle is not affected when so modified for use in snow.

Various other embodiments of the present invention will be apparent to those skilled in the art without departing from the spirit and scope thereof.

What is claimed is:

1. A motor driven wheeled vehicle having a rear axle, a single rear wheel on said axle, and a vehicle frame supported by said rear axle on each side of said rear wheel, in combination with a rear propulsion attachment to adapt said vehicle for winter use without removal of said vehicle's rear wheel, said rear propulsion attachment comprising a generally horizontally disposed propulsion attachment frame, continuous track assemblies mounted outwardly of said vehicle frame on opposite sides of said propulsion attachment frame, means for simultaneously driving each of said continuous track assemblies from said vehicle, and detachable means providing rotatable attachment of said propulsion attachment frame about the end portions of said vehicle's rear axle and being positioned sufficiently above the lowermost portions of said continuous track assemblies to elevate said vehicle rear wheel above said lowermost portions.

2. The vehicle and rear propulsion attachment of claim 1 in which said detachable means comprises two cylindrical journal assemblies, each of which is rotatably mounted about an end portion of said rear vehicle axle.

3. The vehicle and rear propulsion attachment of claim 2 in which said cylindrical journal assemblies contain continuous cylinders and each end portion of said rear vehicle axle is removable from the main portion of said read vehicle axle without effecting the structure necessary for normal operation of said vehicle.

4. The vehicle and rear propulsion attachment of claim 2 in which said cylindrical journal assemblies contain split cylinders having two semicylindrical portions and means for detachably clamping said semicylindrical portions together in cooperative relationship to provide the equivalent of a continuous cylindrical journal assembly.

References Cited

UNITED STATES PATENTS

| 1,068,883 | 7/1913 | Frank. |
| 1,194,794 | 8/1916 | Trione. |
| 3,077,238 | 2/1963 | Nelson _____ 180—9.24 X |
| 3,318,403 | 5/1967 | Hansen _____ 180—9.24 X |

FOREIGN PATENTS

| 696,937 | 11/1964 | Canada. |
| 477,554 | 1/1953 | Italy. |
| 18,217 | 9/1904 | Sweden. |

RICHARD J. JOHNSON, *Primary Examiner.*